(12) United States Patent
Fiske et al.

(10) Patent No.: US 7,757,609 B2
(45) Date of Patent: Jul. 20, 2010

(54) TRACK SWITCHING FOR A MAGNETICALLY LEVITATED TRANSPORTATION SYSTEM AND METHOD

(75) Inventors: Orlo James Fiske, Goleta, CA (US); Chen Chen, Ningbo (CN); Michael Ricci, Camarillo, CA (US); Bradley Evan Paden, Santa Barbara, CA (US)

(73) Assignee: Launchpoint Technologies, Inc., Goleta, CA (US)

( * ) Notice: Subject to any disclaimer, the term of this patent is extended or adjusted under 35 U.S.C. 154(b) by 234 days.

(21) Appl. No.: 11/868,438

(22) Filed: Oct. 5, 2007

(65) Prior Publication Data

US 2008/0083346 A1    Apr. 10, 2008

Related U.S. Application Data

(60) Provisional application No. 60/850,182, filed on Oct. 10, 2006.

(51) Int. Cl.
*B60L 13/08* (2006.01)
*B60L 13/04* (2006.01)
*B61B 13/08* (2006.01)

(52) U.S. Cl. .......................... 104/130.02; 104/130.01; 104/130.07; 104/281

(58) Field of Classification Search ............ 104/130.01, 104/130.02, 130.03, 130.07, 281, 283
See application file for complete search history.

(56) References Cited

U.S. PATENT DOCUMENTS

| 3,845,720 | A | * | 11/1974 | Bohn et al. ............ 104/130.02 |
| 3,861,321 | A | * | 1/1975 | Goodnight et al. .......... 104/284 |
| 3,964,398 | A | | 6/1976 | Breitling |
| 4,072,110 | A | * | 2/1978 | Jayawant .................... 104/284 |
| 4,934,279 | A | * | 6/1990 | Azukizawa et al. .... 104/130.02 |
| 5,517,924 | A | | 5/1996 | He et al. |
| 5,865,123 | A | | 2/1999 | Powell et al. |
| 6,044,770 | A | | 4/2000 | Davey et al. |
| 6,101,952 | A | | 8/2000 | Thornton et al. |
| 6,357,358 | B2 | | 3/2002 | Henderson |
| 6,363,857 | B1 | | 4/2002 | Kauffman |
| 6,684,794 | B2 | | 2/2004 | Fiske et al. |
| 6,758,146 | B2 | | 7/2004 | Post |

(Continued)

OTHER PUBLICATIONS

PCT International Search Report and the Written Opinion dated May 28, 2009 for related PCT application No. PCT/US2008/078392.

*Primary Examiner*—S. Joseph Morano
*Assistant Examiner*—Zachary Kuhfuss
(74) *Attorney, Agent, or Firm*—Foley & Lardner LLP (57) ABSTRACT

A magnetically levitated transportation system employs permanent magnet rails along a guideway that interact with permanent magnets on a vehicle. The rails are optimized to reduce magnetic mass and cost of materials, while maximizing lift force. The vehicle is stabilized in the lateral and yaw directions with feedback controlled lateral control coils that interact with the permanent magnet rails on the guideway. A track switching structure employs permanent magnet rails that gradually widen along a segment of track and separate into two identical diverging rails. Feedback controlled lateral control coils in a moving vehicle stabilize that vehicle over one or the other pairs of diverging rails, as directed by a control computer, thereby causing the vehicle to continue along one path or the other, with no moving or active elements required in the track.

19 Claims, 10 Drawing Sheets

U.S. PATENT DOCUMENTS

| | | |
|---|---|---|
| 6,983,701 B2 | 1/2006 | Thornton et al. |
| 7,096,794 B2 | 8/2006 | Post |
| 7,527,001 B2 * | 5/2009 | Li et al. .................... 104/281 |

* cited by examiner

TRACK SWITCHING FOR A MAGNETICALLY LEVITATED TRANSPORTATION SYSTEM AND METHOD

CROSS-REFERENCE TO RELATED PATENT APPLICATIONS

Embodiments of the present invention relate to U.S. Provisional Application Ser. No. 60/850,182, filed Oct. 10, 2006, entitled "Track Switching for a Magnetically Levitated Transportation System and Method", the contents of which are incorporated by reference herein and which is a basis for a claim of priority in the current application.

BACKGROUND OF THE INVENTION

1. Field of the Invention

The present invention relates, generally, to transportation systems and processes, and in particular embodiments, to ground-based transportation systems and processes employing magnetically levitated vehicles for transportation of freight or passengers. Certain embodiments are configured for relatively low-cost and energy efficient implementations.

2. Background of the Disclosure

Transportation of freight and passengers can be necessary in the modern economic society. During the current and previous centuries significant advances have been made with respect to the speed and efficiency of transportation systems. Such advances have been driven, at least in part, by economic demand. Indeed, high-speed transportation of freight and passengers has long been recognized as having significant economic value. This is evidenced by the widespread use of air transportation and increasing use of high-speed rail in both freight and passenger markets.

Conventional high-speed rail systems can require mechanical contact between wheels and rail, giving rise to vibration, noise, wear, and frictional losses of energy. Air transportation requires the high costs of pilots, air traffic control systems, airports and an even larger expenditures of energy.

Past efforts to address some of those shortcomings have included efforts to develop magnetically levitated train systems. Prototypes of such systems have been constructed that would require costly infrastructure in the form of heavy and precise track systems or expensive superconducting magnets. In some prior systems, massive trains have been proposed, requiring massive, expensive infrastructure. In addition, prior systems have employed relatively complex geometries, due to a perceived necessity to provide horizontal surfaces to create levitation forces and vertical surfaces to create lateral forces. Moreover, since electromagnets can only generate attractive forces, some proposed systems have included vehicles configured with awkward and heavy structures that reach underneath an iron rail to create lift.

A common feature of many such prior designs is that the vehicle structure wraps partially around the track structure or the track structure wraps partially around the vehicle structure. Such structures can be complex and massive, as they support high loads applied to cantilevered substructures. An indication of the complexity of these systems is that there is no single plane that separates the vehicle magnetic components from the track magnetic components. This follows from the use of both vertical and horizontal magnetic gaps in such designs. These structures are not only large and expensive, but also make track switching slow and cumbersome, compromising the potential for speed and convenience offered by maglev systems.

A railroad switch, or turnout, is a mechanical installation enabling trains to be guided from one line of rail tracks to another. In a typical installation, rail track "A" divides into two tracks, "B" and "C". At the bifurcation point, a switch contains a pair of linked tapering rails (point blades) that can be moved laterally into one of two positions, determining whether a train coming from "A" will be led towards "B" or towards "C". Likewise, in order to allow maglev vehicles to be directed along varying transportation routes, some type of mechanism must be provided that is capable of switching the vehicle from one guideway to another. In some maglev systems, such as the German Transrapid and the Japanese Railway MLX-01, this mechanism involves physically displacing a large guideway segment in order to redirect the maglev train.

U.S. Pat. No. 3,964,398 (titled "Magnetic-suspension vehicle system having switch tracks") to Breitling, describes a magnetic-suspension vehicle system in which a vehicle is displaceable along a track provided with armature rails which cooperate with electromagnets carried by the vehicle to suspend the latter from the track. Switch locations provided along the track and the rails in these regions are designed to allow crossover of the electromagnetic arrangement on each side of the vehicle between main and auxiliary rails. The main and auxiliary rails are shaped to prevent mutual interference at the crossover points or their junction sites at a common side of the vehicle.

U.S. Pat. No. 5,517,924 (titled "Double row loop-coil configuration for high-speed electrodynamic maglev suspension, guidance, propulsion and guideway directional switching") to He, et al. describes a stabilization and propulsion system comprising a series of loop-coils arranged in parallel rows wherein two rows combine to form one of two magnetic rails. Levitation and lateral stability are provided when the induced field in the magnetic rails interacts with superconducting magnets mounted on the magnetic levitation (maglev) vehicle. The loop-coils forming the magnetic rails have specified dimensions and a specified number of turns and by constructing differently these specifications, for one rail with respect to the other, the angle of tilt of the vehicle can be controlled during directional switching. Propulsion is provided by the interaction of a traveling magnetic wave associated with the coils forming the rails and the superconducting magnets on the vehicle.

U.S. Pat. No. 5,865,123 (titled "Electromagnetic induction suspension and horizontal switching system for a vehicle on a planar guideway") to Powell, et al. describes an electromagnetic induction suspension and horizontal switching system for a vehicle on a substantially planar guideway that provides vertical lift and stability and lateral stability for a vehicle, including pitch, yaw and roll stability. The suspension and stabilization system allows electronic, horizontal switching between multiple substantially planar guideways such as a mainline guideway and a secondary guideway, which may be accomplished at speeds over 300 m.p.h. Proximal to and within a switching area at the intersection of the mainline guideway and the secondary guideway, the respective lift and stability systems for each guideway coexist and may be switched on or off, depending on the path chosen for the vehicle.

SUMMARY OF THE DISCLOSURE

Embodiments of the present invention relate, generally, to magnetic levitation transportation systems and methods, for example, but not limited to those as described in U.S. Pat. No. 6,684,794, and further including track switching configurations for such magnetic levitation transportation systems. For example, embodiments of the invention, relate to a guideway formed in part from permanent magnet rails that gradually bifurcate into two track paths. Permanent magnets can be employed on a vehicle for providing (or contributing to) levitation of the vehicle over the magnet rails, and electromagnets can be employed on the vehicle for providing (or contributing to) lateral control of the vehicle relative to the magnet rails and controlling the lateral position of the vehicle along one bifurcation or the other. An additional advantage available in the embodiments of the current invention can be the lack of a need for moving or active elements in the guideway of the present invention. In addition, embodiments of the invention may provide an ability of a vehicle to cross a switching section at any speed, from barely moving up to a very high maximum speed.

One embodiment of the current invention relates to a transportation system that includes at least one original guideway having a length dimension and at least one array of permanent magnets extending along the original guideway length dimension. The original guideway can bifurcate into a first and a second guideway. This system embodiment can also include one or more vehicles, where each vehicle has at least one permanent magnet array arranged to magnetically interact with the at least one array of permanent magnets on the guideway. The vehicle can travel along the length dimension of the guideway. This embodiment further includes at least one electromagnetic coil for selecting either the first or the second guideways. In another embodiment, the permanent arrays can be arranged in a Halbach array formation. In another embodiment of the current invention, the first and second guideways have the same permanent magnet array formation as the original guideway.

In another embodiment, the vehicle can include a magnetic assembly that comprises, two electromagnetic coils and one magnet array in Halbach formation. Another embodiment, includes a magnetic assembly coupled to the vehicle using a rotatable pivot.

In yet another embodiment, two magnetic assemblies can be coupled to each other using a structure element and the structure element can be coupled to the vehicle using a rotatable pivot located at the center of the structure element. In another embodiment, the electromagnetic coils can be arranged in a series or a parallel formation to produce lateral forces for magnetic interaction with the at least one guideway.

Another embodiment, includes a controller for controlling the direction and the magnitude of a current in the electromagnetic coils. The controller can exert lateral magnetic forces on the guideways to move the vehicle in a right or a left direction. The controller receives feedback signals related to lateral position of the vehicle at any given time and compensates by adjusting the current in the electromagnetic coils for speed and turn radius of the guideway.

Another embodiment can include a crossing zone, where the first and second guideways bifurcate from the original guideway. The crossing zone can include additional permanent magnets to provide sufficient levitation for the vehicle in transition and to duplicate the original guideway. In another embodiment, the additional permanent magnets can increase in size to provide additional magnetic force.

Another embodiment of the current invention is related to a bifurcating track for magnetic levitation trains. The track can include at least one guideways having a length dimension and at least one array of permanent magnets extending along the guideway length dimension. The track may further include a second and a third track that bifurcates from the first track via a crossing zone. The second and third track can each have at least one guideway where each guideway has a length dimension and at least one array of permanent magnets extending along the guideway length dimension. The crossing zone can include additional permanent magnets to provide sufficient levitation for the vehicle and to duplicate each guideway. In this embodiment the permanent magnets can be arranged in a Halbach formation.

In another embodiment of the bifurcating track the additional permanent magnets increase in size to provide additional magnetic force.

Another embodiment of the current invention relates to a control system for controlling the lateral movement of a magnetic levitation transportation vehicle. The control system can include a plurality of sensors that provide information related to a maglev vehicle to the controller. The controller can receive signals from the sensors and generate signals for the amplifiers that can generate current to be applied to the stabilization coil coupled to the maglev vehicle. The stabilization coil in this embodiment can produce sufficient magnetic flux to interact with a guideway and create lateral movement in the vehicle.

These and other aspects and advantages of embodiments of the present invention will become apparent from the following detailed description and the accompanying drawings in which various embodiments of the present invention are shown by way of illustrative example.

BRIEF DESCRIPTION OF THE DRAWINGS

FIG. 1b shows a bottom view of the maglev vehicle of FIG. 1a.

FIG. 2a shows a bottom cross-sectional view of the vehicle magnet assembly of FIG. 1a.

FIG. 2b is a cross-sectional view of vehicle and track magnet assemblies from FIG. 2a.

FIG. 4 (A-G) shows a cross-sectional view of the vehicle of FIG. 1 as it progresses through the track bifurcation of FIG. 3.

FIG. 5 (A-L) shows close-up cross-sectional views of one vehicle magnet assembly and one track magnet assembly, as the vehicle progresses through the track bifurcation of FIG. 3.

FIG. 7b shows an enlarged view of the track crossover from FIG. 7a.

DETAILED DESCRIPTION OF THE PREFERRED EMBODIMENTS

The following detailed description is not to be taken in a limiting sense, but is made merely for the purpose of illustrating the general principles and various embodiments of the invention. The present invention relates, generally, to transportation systems and processes, and in particular embodiments, to such systems and processes for magnetically levitated vehicles for transportation of freight or passengers. A transportation system, according to embodiments of the invention, includes at least one vehicle and a guideway along which the vehicle is capable of traveling. In preferred embodiments, the vehicle is capable of carrying freight or passengers and includes one or more compartments or supports for holding freight or passengers.

As described in further detail below, the vehicle can have one or more magnets (or arrays of magnets) and one or more electromagnets for providing levitation and lateral control functions. The magnets (or magnet arrays) may comprise any suitable permanent magnet or magnetized material having a relatively large intrinsic coercivity, including, but not limited to well known alloys of neodymium-iron-boron, ferrite, samarium-cobalt, or the like. The electromagnets may comprise electromagnetic coils or other suitable structures for creating an electromagnetic field.

Figure 1A:
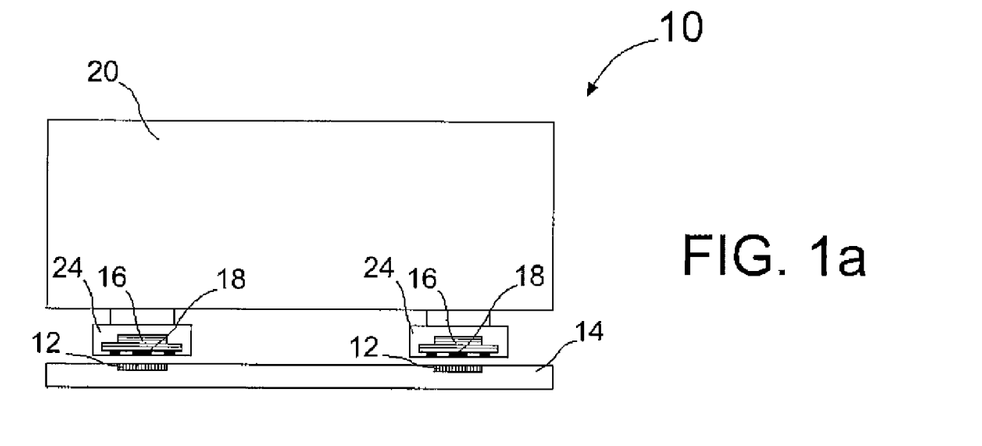
FIG. 1a shows a cross-sectional schematic representation of a magnetic levitation vehicle suspended above magnet rails embedded in a road bed.

FIG. 1a shows a cross-section of a magnetic levitation system 10, including a maglev vehicle 20 that can be suspended above magnet rails 12 embedded in roadbed 14, for example, in a manner as described in U.S. Pat. No. 6,684,794, titled "Magnetic Levitation Transportation System And Method," to Fiske, et al., the disclosure of which is incorporated herein by reference. Roadbed 14 may comprise a road-like structure, an elevated structure, an underground tube or tunnel structure or other suitable guideway or path for supporting magnet rails 12. Further example embodiments of the invention employ guideway structures of the type described in U.S. Pat. No. 6,684,794. Each vehicle magnet array 16 may comprise, for example, a Halbach array formation, and may be mounted in a magnet assembly 24, to produce magnetic fields toward the roadbed 14. Magnet rails 12 include magnet arrays that can be arranged, for example, in Halbach arrays, to produce complementary magnetic fields directed upward, toward the vehicle. In combination, vehicle magnet array 16 and magnet rails 12 can create a powerful repulsive force that acts to levitate the maglev vehicle 20. In this configuration, levitation can be vertically stable (repulsive force increases as the gap between vehicle and track decreases, and vice-versa), but further laterally stability may be desired. Lateral forces can be zero when vehicle magnet array 16 is centered above magnet rails 12, but increase as maglev vehicle 20 moves laterally to one side or the other with respect to magnet rails 12.

Figure 6:
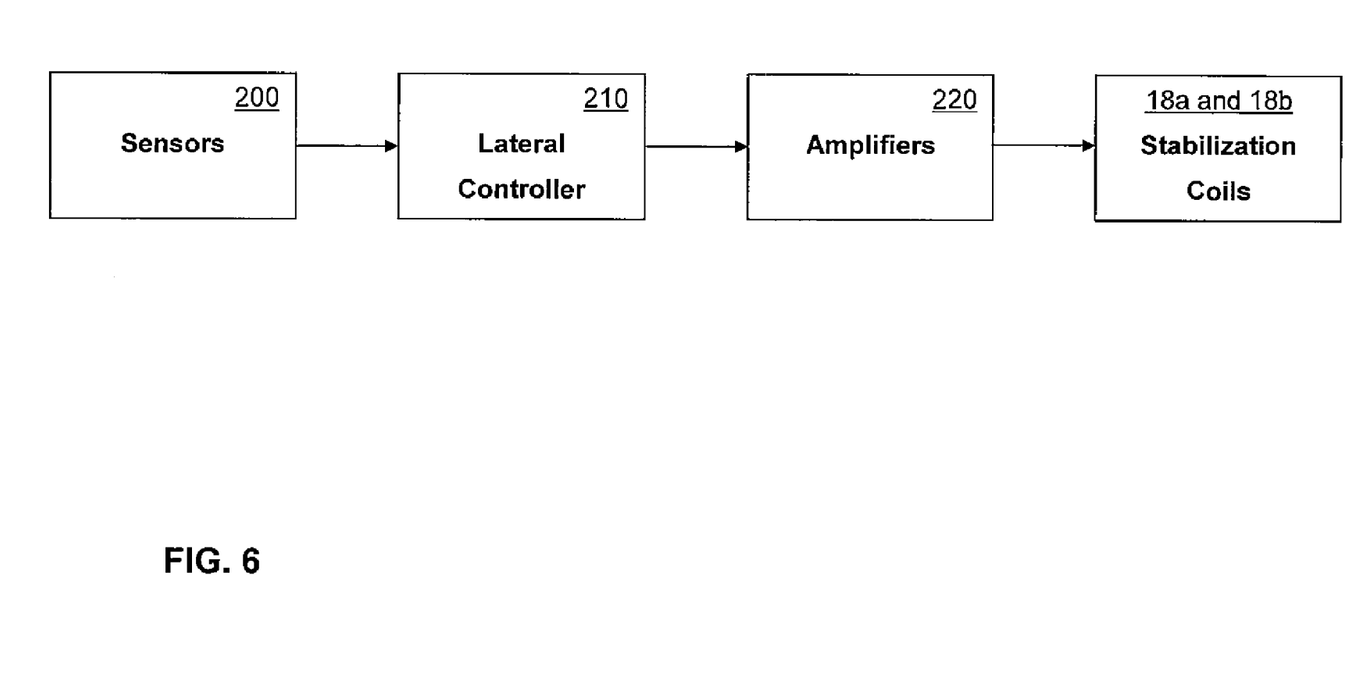
FIG. 6 shows a block diagram representation of a control system for the track switch and transportation system.

The relative lateral position of vehicle magnet array 16 and magnet rails 12 is monitored by position sensors 200 shown in FIG. 6 in a block diagram. A control computer controls the application of electrical current from an amplifier 220 through stabilizing coil set 18. The stabilization coil set 18 can be made of, for example, electro-magnetic material, magnets that can be physically moving or rotating or material with varying magnetic intensity. The stabilization coil set 18 can be mounted at various location on the vehicle, such as but not limited to, below vehicle magnet array 16, to create magnetic fields that interact with magnet rails 12 to produce lateral magnetic forces. This interaction can create a feedback loop that counteracts unwanted lateral motion and can stabilize the lateral position of maglev vehicle 20. As will be explained below, this stabilizing action can be used to control the maglev vehicle 20 in a manner to effectively "steer" the maglev vehicle along one or the other track when a track bifurcates in two different directions.

Figure 1B:
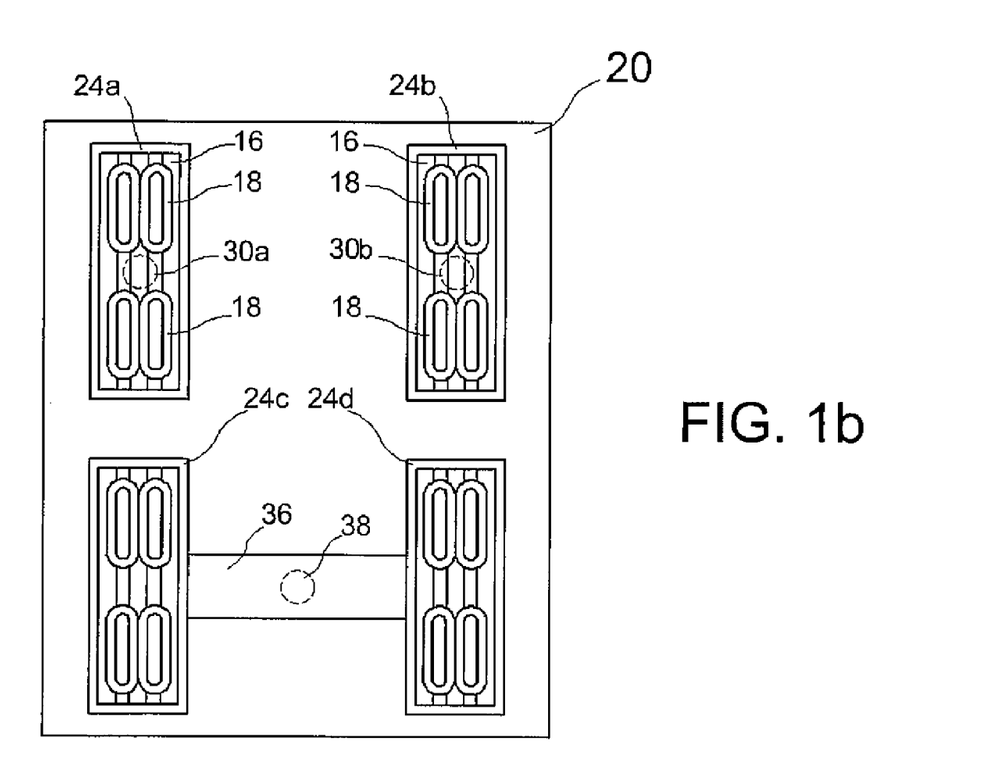

FIG. 1b shows one example embodiment, with four magnet assemblies 24a, 24b, 24c and 24d. In this example embodiment each maglev assembly includes two stabilizing coil sets 18, but in other embodiments the magnet assembly can include one or any suitable number more than one coil sets. Magnetic assemblies 24a and 24b show one example placement for pivot joints 30a, such as, but not limited to pivotal truck structures, pivot pins or the like, for pivotally joining the magnetic assemblies to another portion of the vehicle 20. The pivot joints 30a allow the maglev assemblies to follow a curved track or switch tracks by allowing the maglev assemblies to pivot about the axis of a pin, joint or the like (for example, the central axis of the circle representing the pivot joints 30a and 30b in FIG. 1b). An alternative arrangement of a pivot joint 38 is shown with respect to the magnetic assemblies 24c and 24d, where the pivot 38 is mounted on structural element 36 connecting the two magnetic assemblies 24c and 24d. Pivots 30a, 30b and 38 allow the magnetic assemblies 24 to rotate about a rotation axis (an axis arranged into and out of the page in FIG. 1b), to allow the magnetic assemblies to better follow curved tracks and decreasing the minimum turn radius of maglev vehicle 20.

Figure 2A:
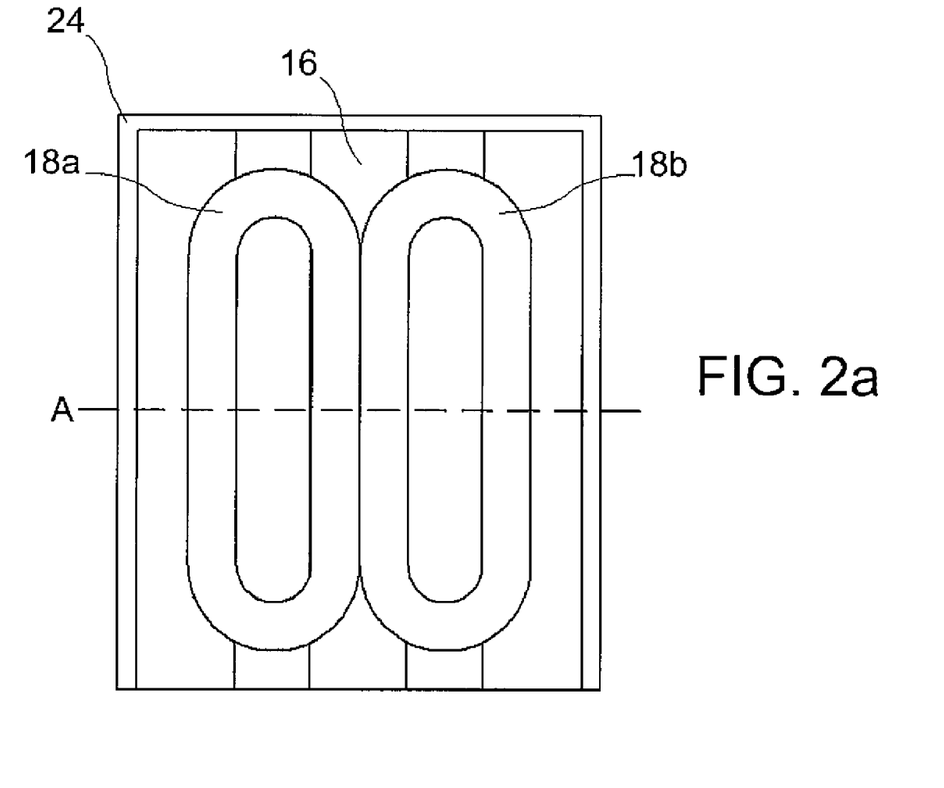

FIG. 2a illustrates part of a vehicle magnet assembly 24 of FIG. 1b, showing left stabilization coil 18a and right stabilization coil 18b as they relate to vehicle magnet array 16. The vehicle magnet assembly 24 can provide sufficient magnetic force while using one or more stabilization coils. In other embodiments, the coils can be in either series or in parallel to each other. In yet other embodiments, a coil is not necessary, where a magnetic force generator that generates magnetic flux can be controlled with precession and interacts with the magnetic rails 12.

Figure 2B:
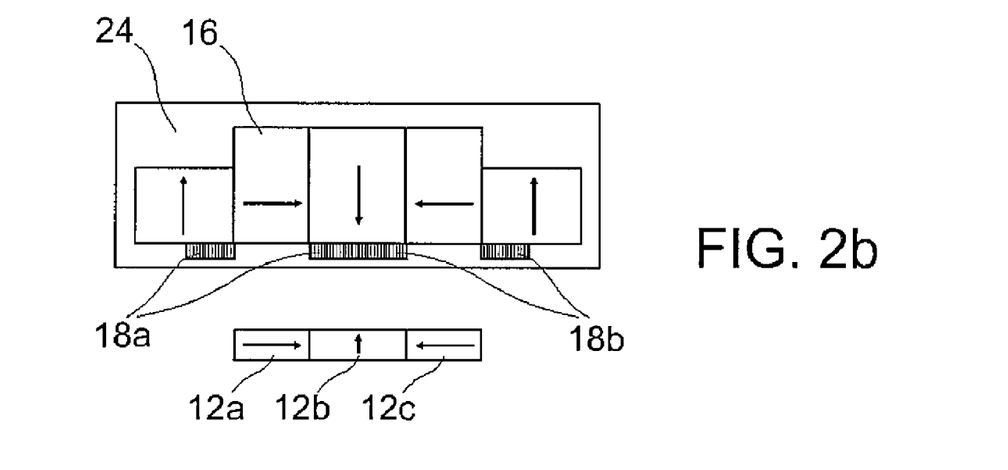

FIG. 2b shows one embodiment of a cross-sectional view of magnetic assembly 24, taken along line A of FIG. 2a. Included in FIG. 2b is magnet rail 12, showing polarities of magnets in the rail array (for example, the arrowhead indicates North and the non arrowhead indicates South) and relative sizes of each of constituent magnets 12a, 12b and 12c. The size of the permanent magnets used for the arrays can vary, based upon a variety of factors such as but not limited to the weight, and size of the vehicle. Vehicle magnet array 16 can be one or more magnet components, and magnet rail 12 can be made of at least three magnet components, other arrangements such as but not limited to six vehicle magnets and four magnetic rail magnets are possible. The magnets in each array can be in an orientation such that the magnetic flux points primarily in one direction for each array.

The stabilizing coil set 18 includes left coil 18a and right coil 18b. In normal operation, vehicle magnet array 16 is suspended at an unstable equilibrium point centered over track magnet element 12b. One embodiment the stabilization coils 18a and 18b has current flowing through them creating sufficient magnetic flux necessary to change the lateral direction of the maglev vehicle 20. The magnetic flux generated by the stabilization coils 18a and 18b can be controlled by a controller that will be discussed in greater detail below, referring to FIG. 6.

Figure 3:
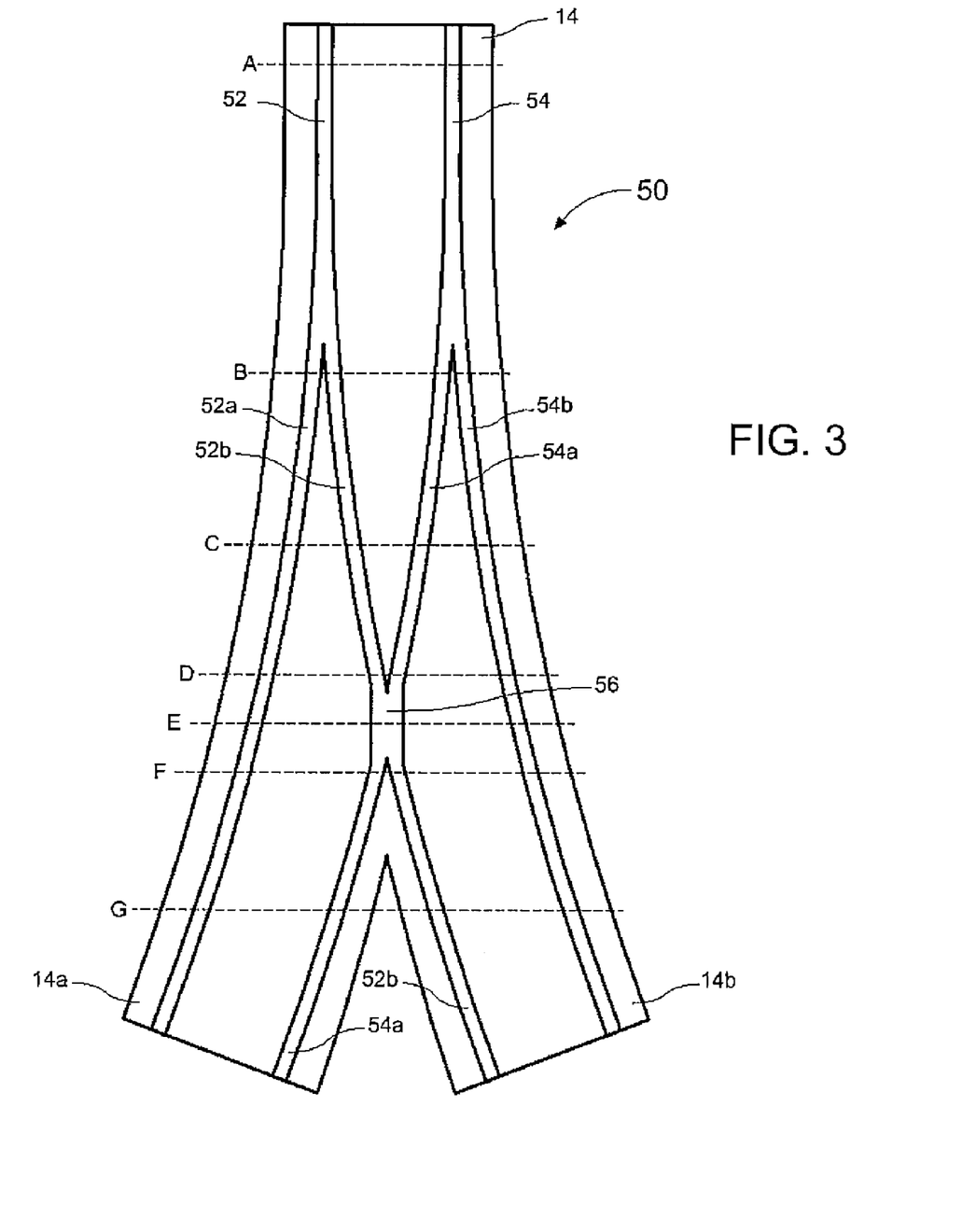
FIG. 3 shows a top view of a general configuration of magnet rails as they bifurcate for track switching according to an embodiment of the present invention.

FIG. 3 illustrates a top view of maglev track switch 50, showing a configuration of a roadbed 14 and magnet rails 52 and 54 as they bifurcate for track switching according to the embodiments of the present invention. While FIG. 3 shows one example track switch, there are many varieties of track switches that can be implemented using embodiments of the current invention. Other types of track switches include for example, but are not limited to, Double slip, Single slip, Crossover, Stub switch, Plate switch, Three-way switch, Interlaced turnout, Wye switch, Derailers and Switched diamond.

In FIG. 3, magnet rails 52 and 54 gradually widen, then split into two identical rails. Magnet rail 52 splits into rails 52a and 52b, while magnet rail 54 splits into rails 54a and 54b. The length of this bifurcation zone is related to the highest speed at which the vehicle is allowed to transit the switch, and can be short (on the order of a few meters or less)

if the vehicle transits at low speed, or long (hundreds of meters or more) if the vehicle can transit at high speed. Magnet rails 52b and 54a converge into combined rail 56 in a "crossing zone", and thereafter diverge again to complete the track switch bifurcation, with magnet rails 52a and 54a continuing on roadbed 14a, and magnet rails 52b and 54b continuing on roadbed 14b. The further track formed from rails 52a and 54a is similar in configuration to the original track and the further formed track from 52b and 54b is similar in configuration to the original track. Lines A through G provide reference points for roadbed and track cross sections illustrated in the following figure, as discussed in greater detail below.

Figure 4:
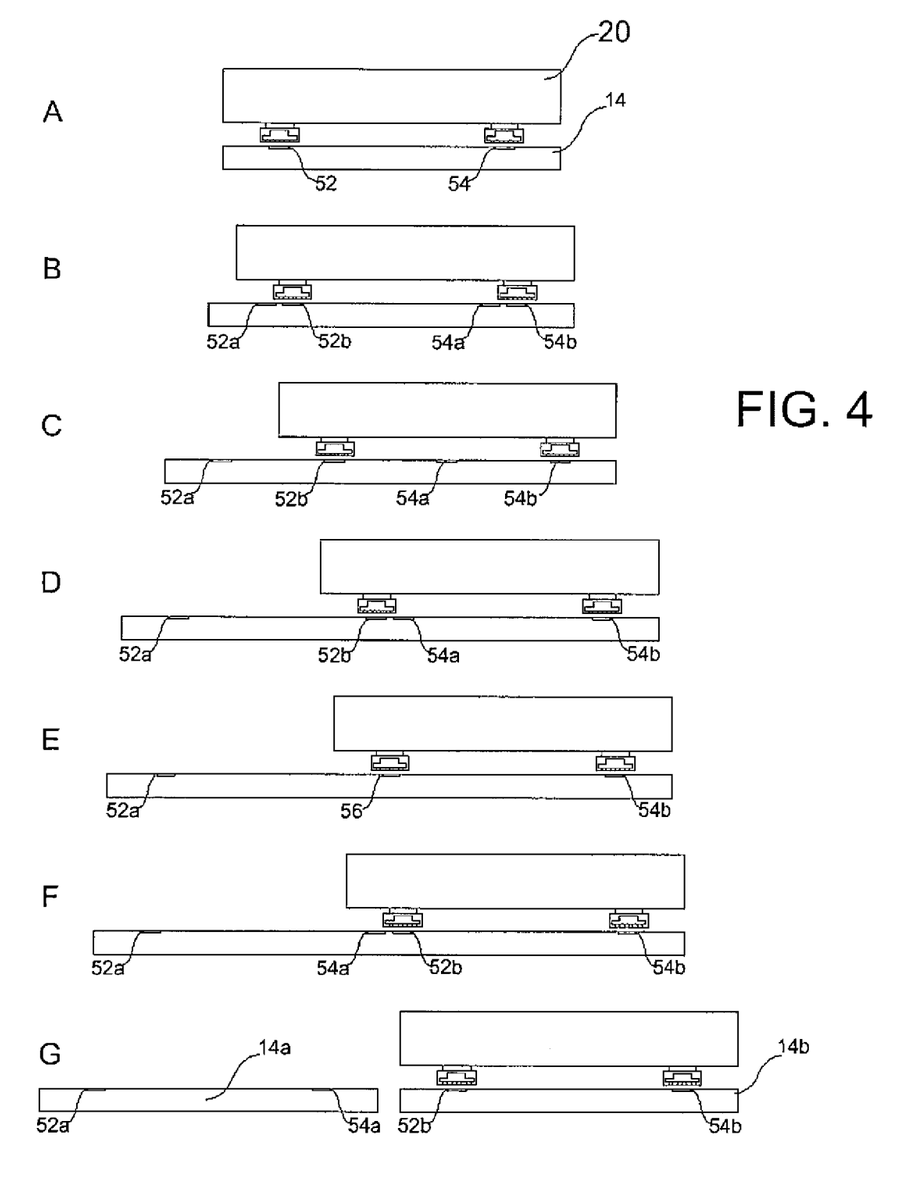

FIGS. 4 (A-G) show cross-sectional views of the vehicle of FIG. 1 as it progresses through the track bifurcation of FIG. 3. FIG. 4A corresponds to line A of FIG. 3, FIG. 4B corresponds to line B of FIG. 3, and so on. In FIG. 4A, maglev vehicle 20 is moving over roadbed 14 including magnet rails 52 and 54. In FIG. 4B, the roadbed has widened slightly, magnet rail 52 bifurcates into rails 52a and 52b, likewise magnet rail 54 bifurcates into rails 54a and 54b, and maglev vehicle 20 has moved rightward to follow track b. In FIG. 4C the roadbed has further widened, the magnet rails have further separated, and maglev vehicle 20 has moved further to the right. In FIG. 4D, the roadbed has widened even further, while magnet rails 52b and 54a have nearly converged. In FIG. 4E, magnet rails 52b and 54a have completely converged to form a combined rail 56 or a crossing zone and the maglev vehicle 20 is above rail 56. In FIG. 4F, magnet rails 52b and 54a have diverged again, and the roadbed is approaching its greatest width. In FIG. 4G, the roadbed has diverged into separate guideways 14a and 14b, with maglev vehicle 20 continuing on track b. When traversed in the opposite sequence, starting with FIG. 4G and ending with FIG. 4A, this also depicts the progress of a vehicle through the intersection of two guideways. In other words, the vehicle can transit the track bifurcation in either direction.

FIG. 5A-L depicts a cross-sectional view of a vehicle magnet array 16 with a pair of stabilization coils 18a and 18b from the vehicle of FIG. 4, and a bifurcating rail magnet array from the track of FIGS. 3 and 4. In this embodiment, the polarities and relative cross-sectional areas of the magnets in each array are shown, as is the current flow direction in the stabilization coils. When produced in the directions shown, current flow in the stabilization coils 18 results in a rightward force on the maglev vehicle 20. The force can "steer" the vehicle on the track located on the right. If the current directions in the coils were reversed, a leftward force could be produced on the vehicle, and the vehicle could steer to the left through the bifurcation.

Figure 5A:
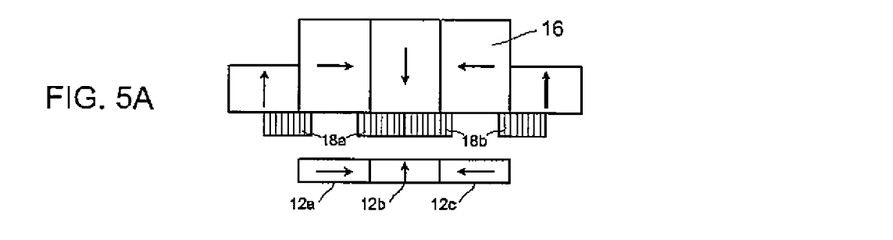

In FIG. 5A, the vehicle is progressing along a guideway prior to reaching a track bifurcation. FIG. 5A shows the vehicle magnet array 16 centered over magnet rails 12, as it would be in a straight section of non-bifurcating track. In this embodiment, magnet rail 12 is composed of three magnets, 12a, 12b and 12c, with polarities as indicated. However, with other configurations more or less magnets can produce similar results. Current direction and intensity is adjusted through the vehicle stabilization coils 18a and 18b by the stabilization control system shown in FIG. 6 to keep the vehicle centered over the track.

Figure 5B:
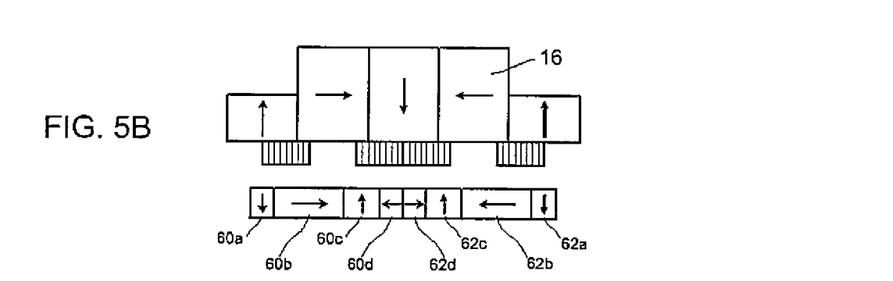

In FIG. 5B, the vehicle has moved into the start of a track bifurcation. In general, bifurcation requires adding new track magnet elements and modifying the size of existing track magnet elements such that the vertical suspension force on the vehicle and the suspension stiffness remain nearly constant while giving the vehicle two possible paths of travel. In this one embodiment, while traveling along the bifurcation the center magnet 12b is replaced by two magnets 60c and 62c, two new magnets 60d and 62d is inserted into the between 60c and 62c, and two new magnets 60a and 62a can be added to each end of the array for a total of eight magnet components. The bifurcating track magnets thicken by up to four times the original rail, in the vertical dimension, to compensate for reduced vertical force caused by the split. Track magnet components 60a, 60b, 60c and 60d now provide one path for the vehicle, with an unstable equilibrium point above magnet 60c. Track magnet components 62a, 62b, 62c and 62d, which form a mirror image of 60a-d, provide the second path, with an unstable equilibrium point above magnet 62c. Vehicle magnet array 16 is centered over magnet rails 60a-d and 62a-d, at an unstable equilibrium point centered above magnet elements 60d and 62d, with vehicle stabilization coils 18a and 18b energized as needed to maintain that position.

Figure 5C:
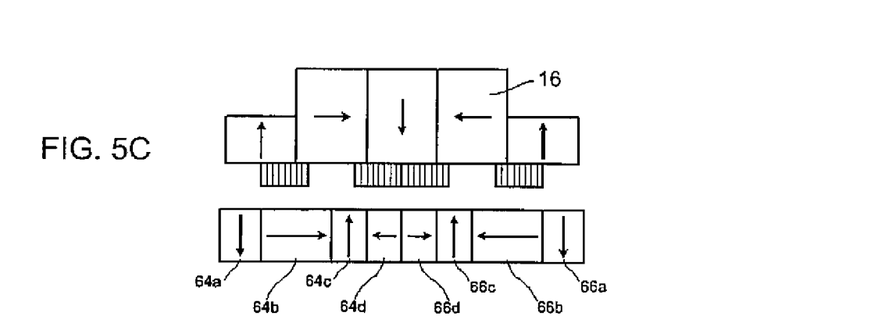

In FIG. 5C, the maglev vehicle 20 has moved further into the track bifurcation. Track magnets 64a-64d and 66a-66d have the same configurations and polarities as 60a-60d and 62a-62d, respectively, but the magnets can have a cross-sectional area that is up to four times larger than in FIG. 5B. The bifurcating track magnets thicken by up to four times the original rail, in the vertical dimension and horizontal direction, to compensate for reduced vertical force caused by the bifurcation.

Figure 5D:
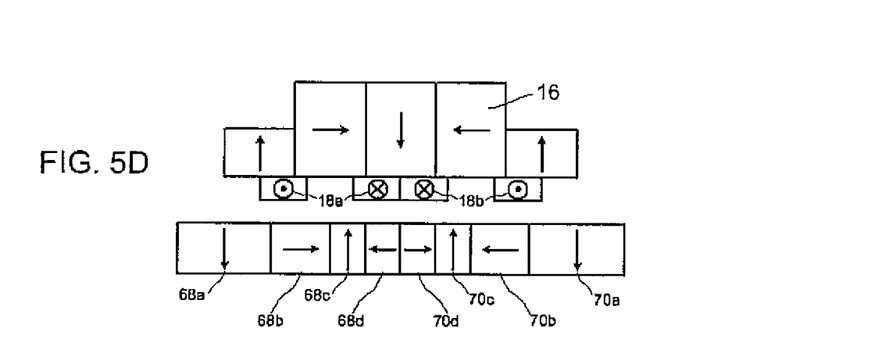

In FIG. 5D, the maglev vehicle 20 continues further into the track bifurcation. Track magnets 68a-68d and 70a-70d are changed in dimensions or cross-sectional area by up to four times the original magnet dimensions. Current is applied by the controller as shown in FIG. 6 to the stabilization coils 18a and 18b (connected in parallel or series) to provide a rightward-directed force. The current directions shown in FIG. 5D produce the rightward force. The magnitude of the current affects the speed at which the switch may be traversed by the maglev vehicle 20. The greater the magnitude of the current the faster the switch may be traveled by the vehicle.

Figure 5E:
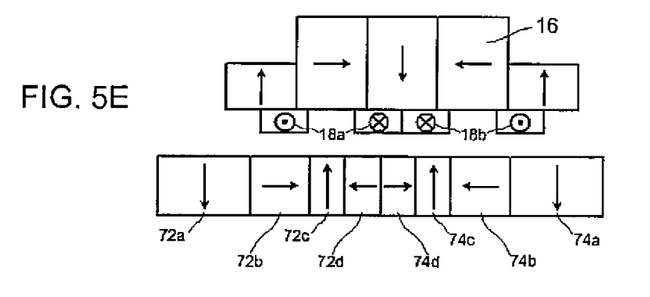

In FIG. 5E the maglev vehicle 20 has progressed further into the bifurcation and has begun to respond to the rightward force created by the stabilization coils 18a and 18b. Vehicle magnet array 16 is now displaced to the right of the center of the track. Track magnets 72a-72d and 74a-74d can be up to four times larger in size or cross-sectional area than track magnets shown in FIG. 5B. The size of the magnets can vary depending on the vehicle weight and size and the amount of current being used.

Figure 5F:
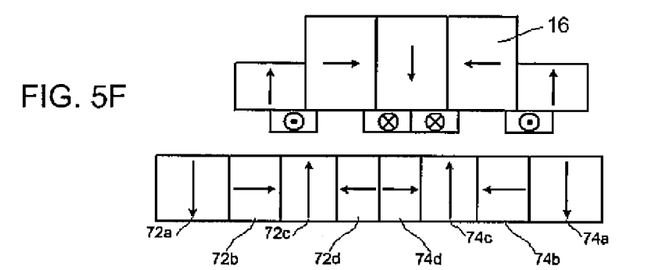

In FIG. 5F, as the maglev vehicle 20 has progressed further into the bifurcation, vehicle magnet array 16 is displaced further to the right of the center of the track magnet array. As shown in FIG. 5F, the track magnets can increase in cross sectional area by up to four times the magnets in FIG. 5B, to provide greater magnetic levitation.

Figure 5G:
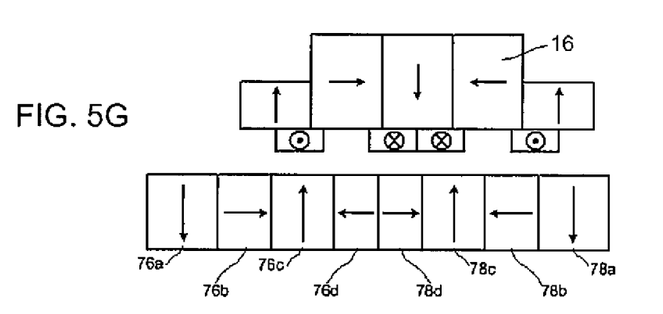

In FIG. 5G, the maglev vehicle 20 has progressed further into the bifurcation. Vehicle magnet array 16 is displaced further to the right of center of the track magnet array. The track magnets have thickened again by up to 4 times the magnets in FIG. 5F, to provide magnetic levitation. FIG. 5G shows track magnets 76a-76d and 78a-78d with the same polarity as the magnets is FIG. 5F, but the cross sectional area of these magnets can be five times the size of the track magnets shown in FIG. 5G.

Figure 5H:
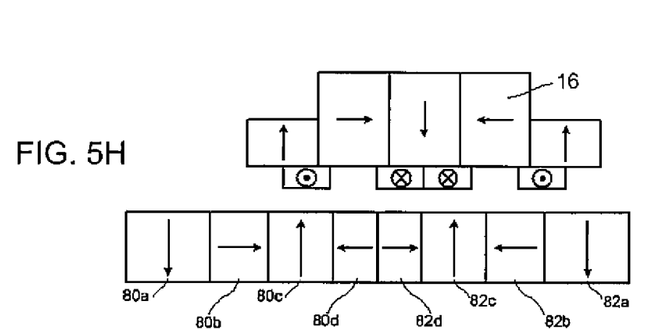

In FIG. 5H, the maglev vehicle 20 continues its forward motion, vehicle magnet array 16 is displaced further to the right of the original track due to the force applied to the stabilization coils 18a and 18b. The track magnets have reached their maximum dimensions and cross-sectional area in FIG. 5H, and can be up to four times the size of the magnets shown in FIG. 5B. FIG. 5H shows larger track magnets 80a-80d and 82a-82d with the same polarity as the magnets is FIG. 5G.

Figure 5I:
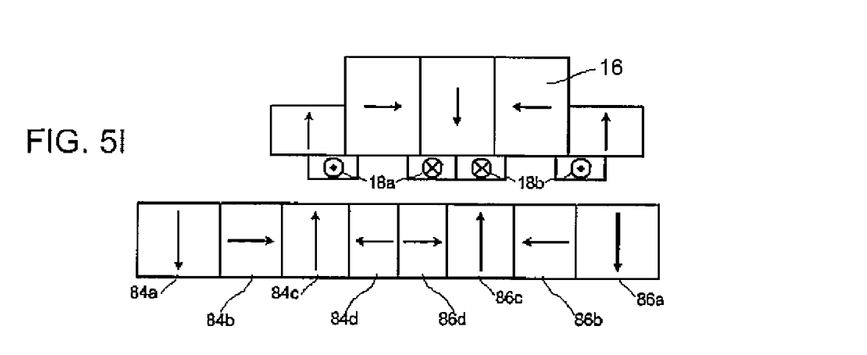

In FIG. 5I the maglev vehicle 20 has moved further and vehicle magnet array 16 is displaced further to the right of center of the original track. Track magnets 84a-84d and 86a-84d are narrower than magnets 80a-80d and 82a-80d.

Figure 5J:
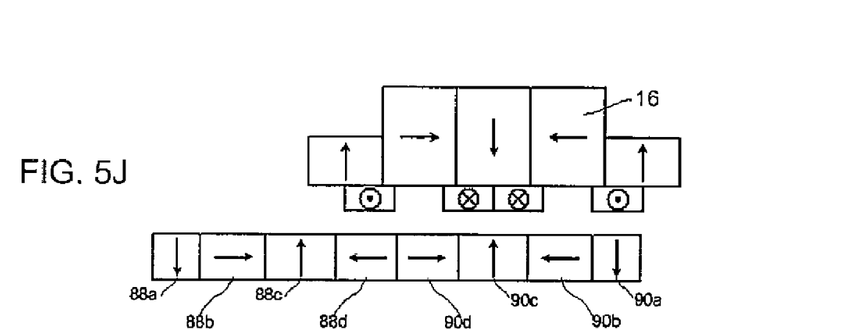

In FIG. 5J, the maglev vehicle has moved forward and is displaced further to the right of center of the original track. Vehicle magnet array 16 is centered over the right half of the bifurcating track, at the unstable equilibrium position above track magnet 90c, and the track magnets have decreased in both width and thickness.

Figure 5K:
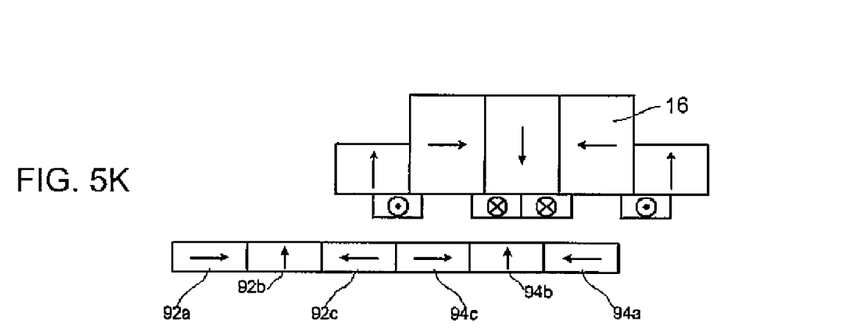

In FIG. 5K the vehicle has continued forward and is displaced further to the right of center of the original track. Track magnets 92a-92c are similar in dimensions to the corresponding elements of a single magnet track, such as track magnets 12a-12c in FIG. 2b. Track magnets 94a-94c are similar to magnets 92a-92c. Vehicle magnet array 16 is slightly to the right of the unstable equilibrium position above track magnet 94b, thereby compensating for the leftward centripetal force caused by the vehicle's motion along the rightward turning track.

Figure 5L:
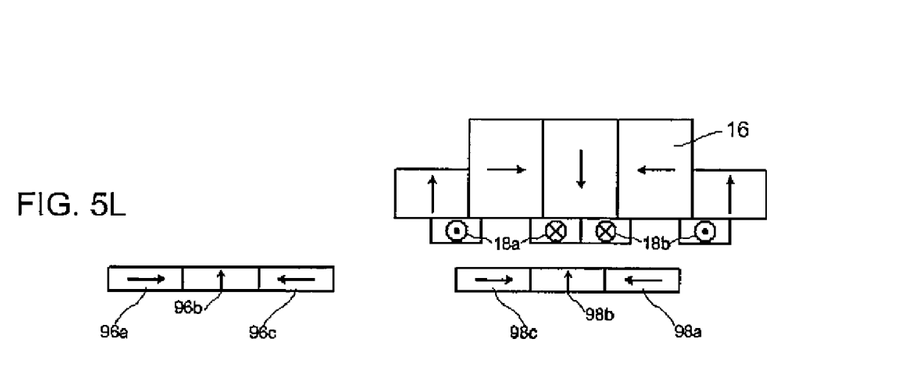

In FIG. 5L track bifurcation is completed. Track magnets 96a-96c and 98a-98c can be identical to track magnets 12a-12c in FIG. 2b, i.e. they can have the same dimensions as the track magnets in a non-bifurcating track segment. Vehicle magnet array 16 is slightly to the right of the unstable equilibrium position above track magnet 98b to compensate for leftward centripetal force from the turn. If the maglev vehicle 20 had steered to the left, rather than the right, the same sequence of events would occur, but with leftward forces from the stabilization coils and leftward motion of the vehicle magnet array 16 and the maglev vehicle 20.

With this system, a track bifurcation may be traversed in either direction. In other words, a vehicle may travel from a single track onto either of two tracks, as shown above, or may travel along either of two tracks leading into an intersection, and onto a single track leading out of the intersection.

In the embodiment illustrated in FIG. 5A-L, both sides of the track bifurcation are curved, one to the left and the other to the right. In other embodiments, one side of the track bifurcation could be straight, allowing the other side to form a turnout as required for an off-line station or side track, for example. Although specific magnet configurations and dimensions are shown, other configurations and dimensions can be employed to achieve similar results.

FIG. 6 illustrates a block diagram of a lateral controller 210. The controller receives signals corresponding to the lateral position of the maglev vehicle 20 in relation to the track magnets at all times in order to adjust the current to the stabilization coils 18a and 18b. The information that is used by the controller 210 can be provided by sensors 200 that can be placed on the vehicle, rails and/or the magnet arrays. The sensors 200 provide feed back signals such as but not limited to speed, lateral position of the vehicle relative to the track and position of the vehicle in the direction of motion relative to a track bifurcation. The controller 210 adjusts the magnitude and the direction of the current in stabilization coils 18a and 18b. In an alternative embodiment, the controller 210 can also control servo motors or other devices cable of adjusting the pivot joints 30a, 30b or 38 depending on the turn radius an speed of the vehicle. Each maglev assembly 24 can have its own lateral controller 210 and associated sensors or each pair of maglev assemblies can share a controller and associated sensors. In another embodiment, a single controller and associated sensors can control all of the maglev assemblies.

Figure 7A:
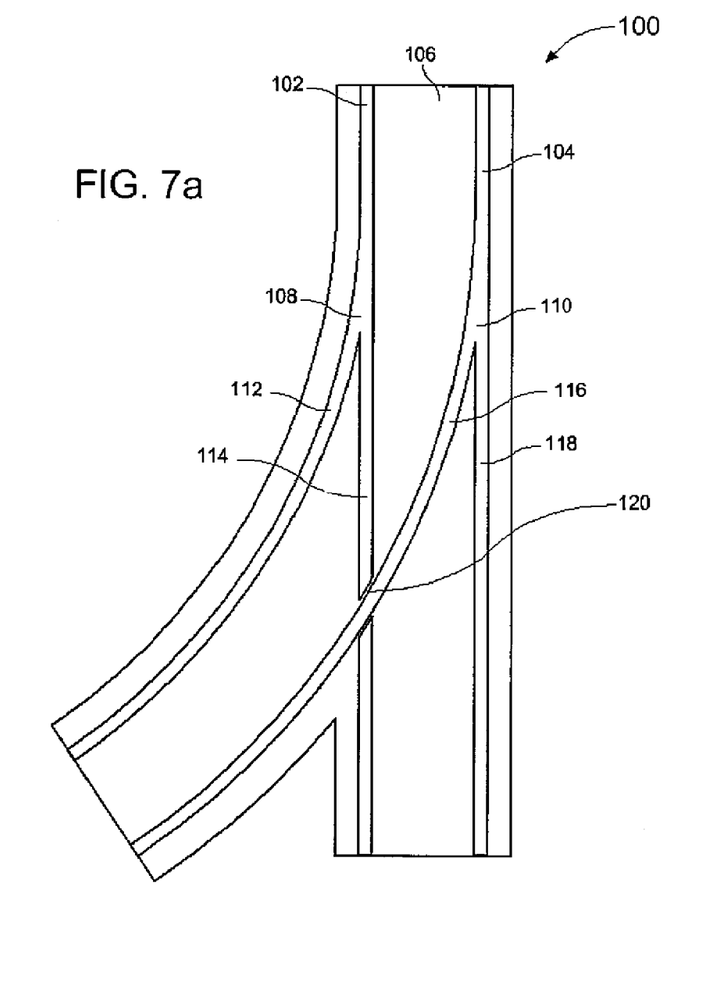
FIG. 7a shows a top view of the general configuration of magnet rails as they bifurcate for track switching according to a another embodiment of the present invention.

FIG. 7a illustrates a top view of maglev track switch 100, showing a configuration of a roadbed 106 and magnet rails 102 and 104 as they bifurcate for track switching according to another embodiment of the present invention. In this embodiment, magnet rail 102 bifurcates at bifurcating point 108, splitting into curved rail 112 and straight rail 114. Likewise, magnet rail 104 bifurcates at 110, splitting into curved rail 116 and straight rail 118. Rather than converging with rail 116, straight rail 114 includes crossover gap 120, which consists of a gap in rail 114 through which curved rail 116 passes. In this embodiment of the current invention, the maglev vehicle 20 can travel along the maglev track switch 100, in a similar manner as described in FIGS. 4 and 5.

Figure 7B:
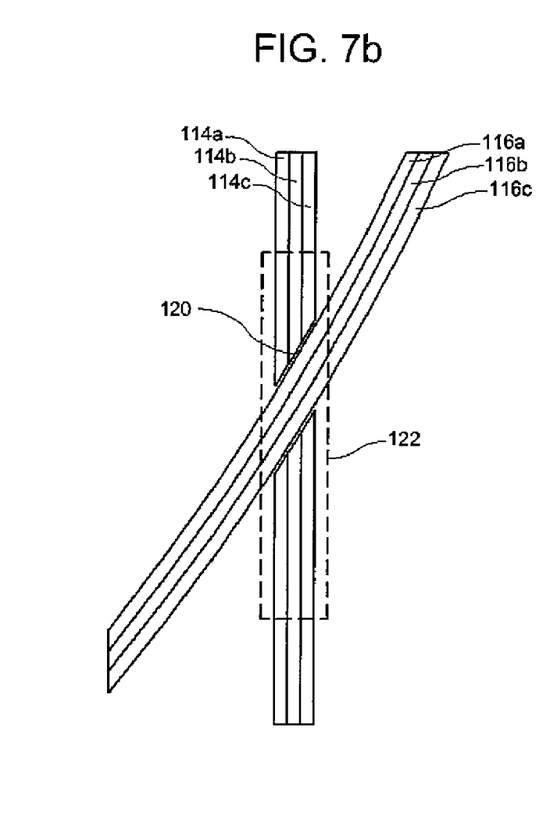

FIG. 7b is a magnified view of crossover 120. Straight rail 114 includes magnet elements 114a, 114b and 114c. Similarly, maglev rail 116 includes magnet elements 116a, 116b and 116c. Crossover gap 120 in straight rail 114 allows curved rail 116 to pass through. Outline 122 indicates the one possible length of a vehicle magnet array, showing how it overlaps crossover gap 120. The vehicle magnet array can be considerably larger than gap 120, only a fraction of the usual levitation force is lost as the vehicle passes over the gap, and does not appreciably effect maglev vehicle 20 levitation.

Figure 8:
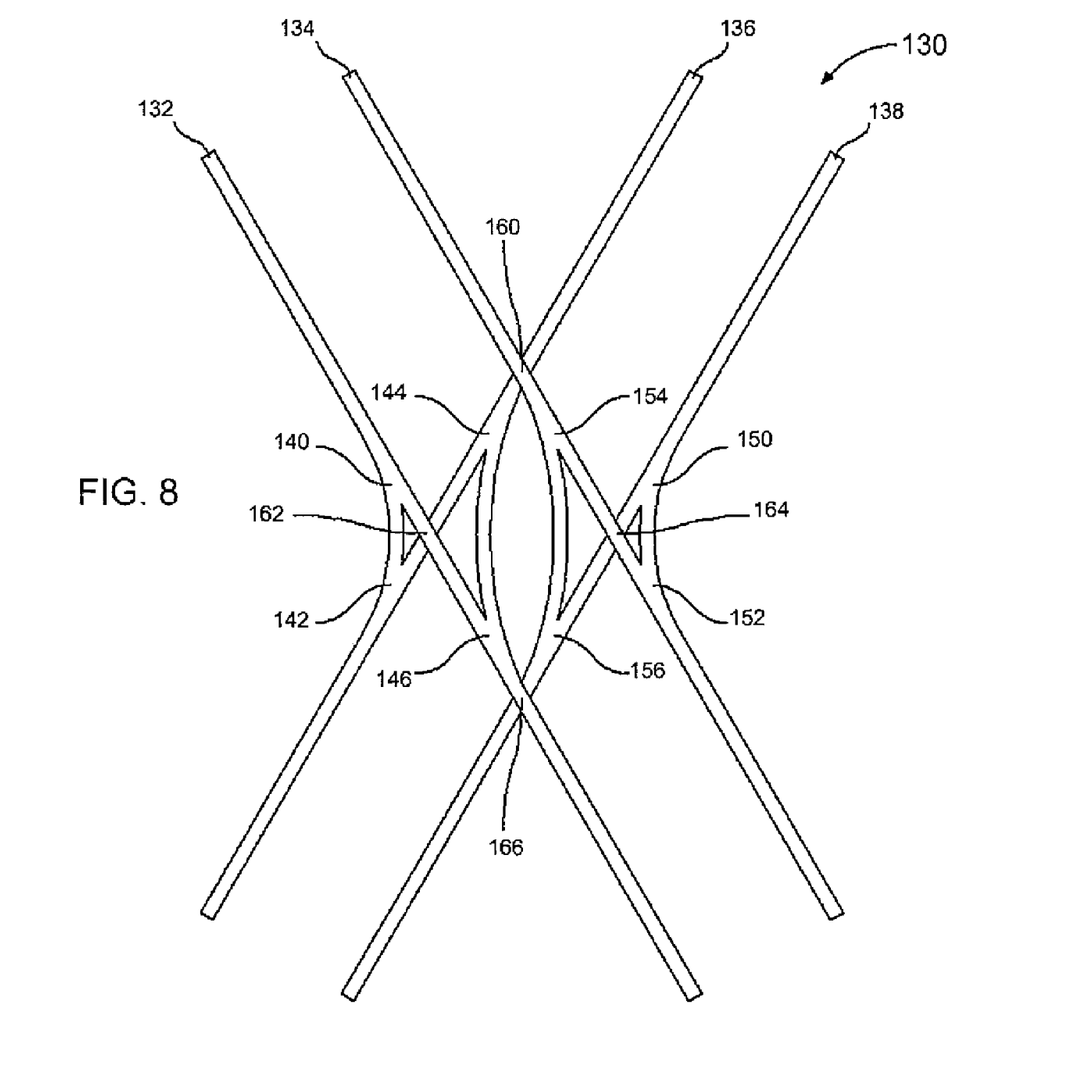
FIG. 8 shows a top view of a double slip track switch according to an embodiment of the present invention.

FIG. 8 is a top view of a double slip maglev track switch 130, indicating how track bifurcations and crossovers can be used to create more complex switching arrangements. One track, comprising parallel maglev rails 132 and 134, intersects a second track, further comprising parallel rails 136 and 138. Track switch 130 includes rail bifurcations 140, 142, 144, 146, 150, 152, 154 and 156. Track switch 130 also includes crossovers 160, 162, 164 and 166. A vehicle traveling on rails 132 and 134 (from either direction) can pass straight through switch 130, without changing tracks, or instead, can turn onto rails 136 and 138. Similarly, a vehicle traveling on rails 136 and 138 can pass straight through switch 130, or can turn onto rails 132 and 134. In this embodiment of the current invention, the maglev vehicle 20 can traverse the double slip maglev track switch 130 in a similar manner as described above regarding FIGS. 4 (A-G) and 5 (A-L).

The guideway need not contain any moving parts, control coils, or active elements of any kind. Because the vehicle is magnetically suspended and not in contact with the magnet rails or any other part of the guideway, and the switch uses no moving mechanical elements, embodiments of the present invention can provide an extremely robust, durable system with little or no wear. Also, the lack of moving or active elements in the guideway allows vehicles moving in close proximity along the guideway to change direction at intersections without regard to the direction chosen by the vehicles ahead or behind them.

What is claimed is:

1. A transportation system comprising:
    at least one original guideway having a length dimension and at least one array of permanent magnets extending along the original guideway length dimension and the at least one original guideway bifurcating into a first and a second guideway at a crossing zone;
    a vehicle having at least one permanent magnet array arranged to interact with the at least one array of permanent magnets extending along the guideway, the vehicle configured to travel along the length dimension of the at least one guideway; and
    at least one electromagnetic coil for selecting at least one of the first and second guideways;
    wherein the crossing zone comprising additional permanent magnets for providing sufficient levitation for the vehicle and wherein, the additional permanent magnets provide greater magnetic force relative to permanent magnets of the original guideway.

2. The transportation system of claim 1, wherein the at least one permanent array of permanent magnets is arranged in a Halbach array formation.

3. The transportation system of claim 1, wherein the first and second guideways have the same permanent magnet array formation as the original guideway.

4. The transportation system of claim 1, the vehicle further having a magnetic assembly comprising, two electromagnetic coils and one magnet array.

5. The transportation system of claim 4, wherein the magnetic assembly is coupled to the vehicle using at least one rotatable pivot.

6. The transportation system of claim 4, wherein at least two magnetic assemblies are coupled to each other using a structure element, the structure element coupled to the vehicle using at least one rotatable pivot located at the center of the structure element.

7. The transportation system of claim 1, wherein the at least one electromagnetic coil is arranged in a series or a parallel formation to produce lateral forces for interaction with the at least one guideway.

8. The transportation system of claim 1, further comprising a controller for controlling a direction and a magnitude of a current in the at least one electromagnetic coil and exerting lateral magnetic force on the at least one guideway to move the vehicle in a direction.

9. The transportation system of claim 8, wherein the controller is for receiving feedback signals related to a lateral position of the vehicle and compensating the lateral position by adjusting the current in the at least one electromagnetic coil for speed and turn radius of the at least one guideway.

10. The transportation system of claim 1, wherein the first and second guideways bifurcate from the original guideway at the crossing zone, the crossing zone comprising additional permanent magnets for providing sufficient levitation for the vehicle and for duplicating the original guideway.

11. The transportation system of claim 10, wherein, the additional permanent magnets are greater in size relative to permanent magnets of the original guideway to provide additional magnetic force.

12. A bifurcating track system for magnetic levitation vehicles comprising:
   a first track having a length dimension and at least one array of permanent magnets extending along the first track length dimension, the at least one array of permanent magnets for the first track comprising a first magnet in an array center and having generally vertically oriented poles, a second magnet and a third magnet on respectively opposite sides of the first magnet and each having generally horizontally oriented poles;
   a second and a third track that bifurcate from the first track using a crossing zone, the second and third track each having a track length dimension and at least one array of permanent magnets extending along the second and third track length dimension, the at least one array of permanent magnets for each of the second track and the third track comprising a first magnet in an array center and having generally vertically oriented poles, a second magnet and a third magnet on respectively opposite sides of the first magnet and each having generally horizontally oriented poles; and
   the crossing zone connecting the first track to each of the second track and the third track and having at least one array of permanent magnets for the crossing zone comprising first and second magnets in a pair at an array center and that have generally horizontally oriented poles, third and fourth magnets on respectively opposite sides of the pair of first and second magnets and having generally vertically oriented poles.

13. The bifurcating track of claim 12 wherein the additional permanent magnets are greater in size than magnets of the first track to provide additional magnetic force.

14. A method of switching tracks for a magnetic levitation vehicle comprising:
   providing at least one original guideway having a length dimension and at least one array of permanent magnets extending along the original guideway length dimension and the at least one original guideway bifurcating into a first and a second guideway at a crossing zone;
   providing a vehicle having at least one permanent magnet array arranged to interact with the at least one array of permanent magnets extending along the guideway, the vehicle configured to travel along the length dimension of the at least one guideway; and
   providing at least one electromagnetic coil for selecting at least one of the first and second guideways; and
   providing the crossing zone with additional permanent magnets for providing sufficient levitation for the vehicle, wherein the additional permanent magnets are greater in size relative to permanent magnets of the original guideway to provide additional magnetic force.

15. The method of switching tracks of claim 14, further comprising providing a current flow direction in each electromagnetic coil to create a magnetic force sufficient to steer the vehicle in a lateral direction.

16. The method of switching tracks of claim 1, wherein:
   the original guideway, the first guideway and the second guideway each have at least one array of permanent magnets that includes a first magnet in an array center and having generally vertically oriented poles, a second magnet and a third magnet on respectively opposite sides of the first magnet and each having generally horizontally oriented poles; and
   the crossing zone has at least one array of permanent magnets that include first and second magnets in a pair at an array center and that have generally horizontally oriented poles, third and fourth magnets on respectively opposite sides of the pair of first and second magnets and having generally vertically oriented poles.

17. The bifurcating track of claim 12, wherein the at least one array of permanent magnets for the crossing zone further comprise fifth and sixth magnets, the fifth magnet arranged on an opposite side of the third magnet relative to the pair of first and second magnets, the sixth magnet arranged on an opposite side of the fourth magnet relative to the pair of first and second magnets, each of the fifth and sixth magnets having generally horizontally oriented poles.

18. The bifurcating track of claim 17, wherein at least one array of permanent magnets for the crossing zone further comprise seventh and eighth magnets, the seventh magnet arranged on an opposite side of the fifth magnet relative to the third magnet, the eighth magnet arranged on an opposite side of the sixth magnet relative to the fourth magnet, each of the seventh and eighth magnets having generally vertically oriented poles.

19. The transportation system of claim 14, wherein:
   the original guideway, the first guideway and the second guideway each have at least one array of permanent magnets that includes a first magnet in an array center and having generally vertically oriented poles, a second magnet and a third magnet on respectively opposite sides of the first magnet and each having generally horizontally oriented poles; and the crossing zone has at least one array of permanent magnets that include first and second magnets in a pair at an array center and that have generally horizontally oriented poles, third and fourth magnets on respectively opposite sides of the pair of first and second magnets and having generally vertically oriented poles.

\* \* \* \* \*